United States Patent [19]

Antelman

[11] Patent Number: 5,336,416

[45] Date of Patent: Aug. 9, 1994

[54] TRIVALENT COPPER WATER TREATMENT COMPOSITIONS

[75] Inventor: Marvin S. Antelman, Rehovot, Israel

[73] Assignee: N. Jonas & Co., Inc., Bensalem, Pa.

[21] Appl. No.: 90,308

[22] Filed: Jul. 12, 1993

[51] Int. Cl.$^5$ .............................................. C02F 1/50
[52] U.S. Cl. .............................. 210/764; 422/19; 422/28; 424/630; 424/668; 514/499
[58] Field of Search ............. 424/630, 668; 514/499; 210/764, 169; 422/19, 28

[56] References Cited

U.S. PATENT DOCUMENTS

| | | | |
|---|---|---|---|
| 1,988,246 | 1/1935 | Krause | 210/764 |
| 2,902,400 | 9/1959 | Moudry et al. | 210/764 |
| 3,681,492 | 8/1972 | Kotzbauer | 210/764 |
| 5,098,582 | 3/1992 | Antelman | 210/764 |
| 5,217,626 | 6/1993 | Yahya et al. | 210/764 |
| 5,223,149 | 6/1993 | Antelman | 210/764 |

*Primary Examiner*—Neil McCarthy
*Attorney, Agent, or Firm*—Salter & Michaelson

[57] ABSTRACT

A method of controlling the growth of bacteria and algae in utilitarian bodies of water such as industrial cooling towers, swimming pools and hot tubs is described. The method includes adding to the water trivalent copper compounds including the periodate and chelate complexes of biuret an tris-(hydroxymethyl) aminomethane. These compounds meet EPA standards of killing 100% of select coliforms within 10 minutes and are efficacious at concentrations as low as 5-9 PPM.

1 Claim, No Drawings

TRIVALENT COPPER WATER TREATMENT COMPOSITIONS

BACKGROUND OF THE INVENTION

The present invention relates to the employment of trivalent copper, i.e., Cu(III) compounds, as bactericidal and algicidal agents in water treatment. The instant inventor has been involved over the past years in searching out new compounds which are anti pathogenic and which can be utilized for water treatment. The inventor's efforts have concentrated upon multivalent silver compounds. To date seven patents have been granted to the inventor in this area as follows: U.S. Pat. Nos. 5,017,295; 5,073,382; 5,078,902; 5,089,275; 5,098,582; 5,211,855; and 5,223,149. The last patent deals with the efficacy of trivalent silver in water treatment and is entitled TRIVALENT SILVER WATER TREATMENT -COMPOSITIONS. Said invention deals with trivalent silver compounds which are very effective as bactericides, bacteriostats, algistats and algicides. Having completed his research in this area, it occurred to the inventor that it may be possible that trivalent copper compounds could also exhibit this behavior. However, such a conclusion was not obvious.

The reason that such a conclusion was not obvious was that it would be entirely possible that Cu(III) compounds could not necessarily be expected to exhibit all or some of the behavior of Ag(III) compounds of an anti-pathogenic nature.

Accordingly, it was decided to investigate the possibility. The reason why such an investigation was undertaken was that if it were ascertained that there was anti-pathogenic efficacy with Cu(III) compounds, then it could be entirely possible that said compounds would offer an economic advantage on a cost effective basis if proven out, since copper is far less expensive than silver. The scientific literature was subsequently scrutinized in order to find suitable trivalent copper candidates for synthesis and subsequent tests and evaluations. Accordingly, trivalent Cu(III) compounds were selected from the literature for further study and subsequent synthesis. The inventor also synthesized other Cu(III) compounds not found in the literature of his own creation. After having accomplished the synthesis of several of these trivalent Cu compounds, those meeting certain criteria, e.g. highest yields were submitted for testing and evaluation as potential bactericides, bacteriostats, algicides and algistats. However, it was not enough that these compounds kill and inhibit the growth of both bacteria and algae, but it is also necessary that said compounds perform the function within a specific time frame as demanded by US Federal standards in conformity with protocols of the Environmental Protection Agency as engendered and defined by the Code of Federal Regulations (CFR) for utilitarian bodies of water of which swimming pools is exemplary.

The evaluations of the Cu(III) compositions proved highly successful. Furthermore, while it is known that divalent copper compounds exhibit useful algicidal and algistatic properties, no copper (II) compound is known to be active as a bacteriostat or bactericide at copper concentrations below 10 PPM, let alone to exhibit said characteristics at any concentration in conformity with the aforementioned specifications defined in the CFR. Accordingly, this invention perfected copper (III) compounds for all these functions and offered the previously outlined economic advantages over the inventor's Ag(III) compounds.

OBJECTS OF THE INVENTION

The main object of this invention is to provide compositions embodying trivalent copper compounds capable of killing and/or inhibiting the growth of bacteria and algae, particularly in utilitarian bodies of water, that is, bodies of water having a particular use, such as swimming pools, hot tubs, drinking-water reservoirs, recreational lakes and industrial cooling towers.

Another object of the invention is to provide a source of trivalent copper ions capable of meeting regular CFR and EPA standards for swimming pools and hot tubs, mainly, a bactericide capable of achieving 100% kills within 10 minutes.

Still another object of the invention is to provide a trivalent copper composition having the aforesaid function but which can be formulated into a marketable concentrated liquid product for utilization in utilitarian bodies of water.

Other objects, features, functions and characteristics of the present invention will become apparent to those skilled in the art when the present invention is considered in view of the accompanying examples. It should, of course, be recognized that the accompanying examples illustrate preferred embodiments of the present invention and are not intended as a means of defining the limits and scope of the present invention.

SUMMARY OF THE INVENTION

This invention relates to the utilization of trivalent copper compounds for bactericidal and algicidal applications in utilitarian bodies of water, such as swimming pools, hot tubs, municipal and industrial water supplies, as for example, cooling towers.

More specifically, this invention concerns stable Cu(III) complexes. Said complexes are designated via the principal quantum number (n), being equal to 3 and the second quantum number (l) being equal to 2. The letter "l" delineates sublevel d electrons. According to the accepted conventional designation, trivalent copper complexes are called $d^8$ complexes; while divalent and monovalent copper are designated $d^9$ and $d^{10}$ complexes, respectively.

Trivalent copper complexes were prepared by various routes of synthesis. However, irrespective of the manner of preparation, all the methods chosen utilized copper sulfate as the starting material source of copper (II) ions and sodium or potassium persulfate as the oxidizing agent for changing Cu(II) complexes to Cu(III).

Of all the Cu(III) compounds prepared three criteria were used to select preferred compounds for evaluation against bacteria and algae. The criteria were as follows:
1. Ease of preparation.
2. Yield of compound.
3. Uniformity and aesthetic nature of appearance.

Accordingly, those final compounds which were chosen for the testing were a Cu(III) periodate complex; the 1:1 Cu(III)/ligand complex of tris-(hydroxymethyl) aminomethane; and the 1:2 Cu(III)/ligand complexes of biuret and dimethylglyoxime.

The compounds chosen were prepared according to methods of preparation described in the literature excepting that of the tris amino complex, for which no preparative method could be found in the literature. The latter was prepared by a route original with the inventor.

The Cu(III) periodate complexes can be depicted by the following structure:

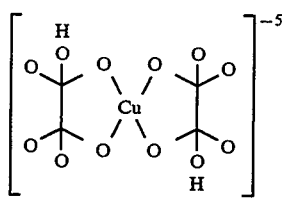

The particular complex prepared here has the following formula:

$$K_2Na_3H_2[Cu(IO_6)_2]$$

It is prepared according to the reaction:

$$2CuSO_4+2Na_2S_2O_8+14NaOH+4KIO_4=K_2Na_3H_2[Cu(IO_6)_2]+5H_2O+6Na_2SO_4$$

This compound was prepared according to the method of Keyworth & Stone (*Analytical Chemistry*, Vol. 27 p.833 [1955]) excepting that the potassium persulfate described in the recipe was replaced with its molar equivalent of sodium persulfate to yield a rich deep brown solution of the diperiodo cuprate(III).

As for the nitrogen complex cuprate (III) compounds of biuret and dimethylglyoxime they were prepared by the persulfate oxidation of the Cu(II) chelate complexes. Thus the biuret complexes were prepared according to J.J. Bour et al., *Inorganic Chemistry*, Vol. 10, No. 6, 1971. The 2:1 ligand/Cu ratio complex can be depicted by the following structure:

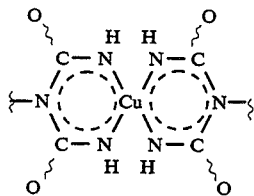

The Cu dimethylglyoxime complexes were prepared according to the method of Morpurgo and Tomlinson (*J. Chem. Soc., Dalton Trans.*, p. 744–51 [1977]).

A probable structure for the Cu(III) dimethylglyoxime complexes depicted in the aforementioned paper is shown below:

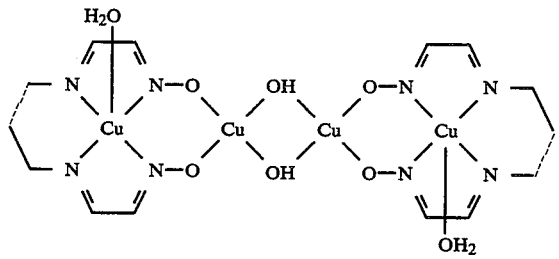

DESCRIPTION OF THE PREFERRED EMBODIMENTS

Illustrative of the preferred embodiments of this invention are the following examples.

EXAMPLE 1

A Cu(III) biuret chelate complex having a 2:1 ligand to Cu ratio was prepared by adding 2.2 grams of biuret with stirring to 100 cc. of 2.5% cupric sulfate pentahydrate solution in distilled water followed by 3.0 grams of reagent-grade KOH. Upon addition of the biuret to the copper sulfate, it remained in suspension until the KOH was added. Then the entire material went into solution as the Cu(II) biuret complex with a clear violet color. Upon addition of reagent-grade potassium persulfate to the heated complex at 90–95° C., an insoluble brown solid was obtained. It was separated by vacuum filtration and dried. It assayed 20.9% Cu and was obtained in a yield of 73%.

The tests were as follows. Plate colonies were grown of fecal coliform cultures in a 10 PPM sodium persulfate solution, which is an optimum concentrate of a preferred synergistic sanitizer enhancement agent used in conventional swimming pools. The control colonies per plate after five minutes were 150. Plates which were treated in like manner with the Cu(III) biuret chelate complex, where the Cu(III) ion concentration was 9 PPM, exhibited 100% inhibition of the colonies. The aforementioned coliform inhibitory evaluations were performed at an EPA certified laboratory.

EXAMPLE 2

A copper (III) tris amino complex was prepared in which the Cu:Ligand ratio was 1:1 in the following manner. 1.3 grams of tris-(hydroxymethyl) aminomethane were added with stirring to 100 cc of a 2.5% cupric sulfate pentahydrate solution in distilled water. This was followed with 2.0g. of reagent-grade KOH which was added to the mixture. The solution changed to a deep blue color. The resulting solution was then heated to 90°–95° C. and 3.5g. of reagent-grade potassium persulfate were added with stirring. A dark-brown precipitate resulted which was filtered and dried. The yield of the product was 65% which assayed at 34.0% copper. The resulting compound was subjected to the same protocol described in Example 1 with the same culture control. The results were identical at the same 9 PPM Cu(III) ion concentration.

EXAMPLE 3

A Cu(III) periodate complex was prepared as follows 2.0g of cupric sulfate pentahydrate were dissolved in 150 cc. of distilled water, 9.2g. of potassium periodate (reagent grade) were added to the solution and 24 cc. of 45% KOH was then added. This was followed by the addition of 8.4g. of sodium persulfate to the solution which was heated to 90°–95° C. The solution was subsequently cooled to room temperature and filtered. After removal of insoluble solid matter, the remaining solution was diluted to 200ml. volume in a volumetric flask and assayed via AA spectroscopy. The yield of Cu(III) periodate was 30%. Aliquots of this solution were taken for subsequent pathogenic evaluations.

An EPA certified laboratory evaluated the periodate utilizing *E. coli* plate colony cultures in a manner analogous to that described in Example 1, excepting that the controls were done without any sodium persulfate present. Under these conditions there were 111 control colonies after 10 minutes; and 100% inhibition of *E. coli* colonies with only 5.0 PPM of Cu(III) ion applied as periodate.

Another EPA certified laboratory subsequently evaluated the Cu(III) periodate complex for inhibiting the growth of algae. The protocol utilized was the Selanastrum range finding test. Plotting the data from the test at prechosen Cu(III) ion concentrations indicated a 100% inhibition at 11 PPM in the presence of 10 PPM sodium persulfate. There was no algae growth inhibition in blanks run with sodium persulfate as controls.

What is claimed:

1. A method for controlling the growth of bacteria and algae in utilitarian bodies of water including swimming pools, industrial cooling towers, hot tubs and reservoirs which comprises adding to the water a stable trivalent copper compound selected from the group consisting of copper periodate, chelate complex of tris(hydroxymethyl) aminomethane, and chelate complex of biuret.

* * * * *